United States Patent

Kuhn et al.

[11] Patent Number: 6,158,567
[45] Date of Patent: Dec. 12, 2000

[54] TRIP DEVICE

[75] Inventors: Wolfgang Kuhn, Esslingen; Roland Steidle, Göppingen; Ulrich Beck, Filderstadt, all of Germany

[73] Assignee: Festo AG & Co., Esslingen, Germany

[21] Appl. No.: 09/234,201

[22] Filed: Jan. 20, 1999

[30] Foreign Application Priority Data

Jan. 31, 1998 [DE] Germany .......... 298 01 630 U

[51] Int. Cl.[7] .................................................. B65G 47/10
[52] U.S. Cl. ............................................................ 198/370.04
[58] Field of Search ................ 198/364, 370.03–370.05; 209/698

[56] References Cited

U.S. PATENT DOCUMENTS

| | | | |
|---|---|---|---|
| 3,750,879 | 8/1973 | Luckett et al. | 198/370.04 |
| 3,881,609 | 5/1975 | Ellis et al. | 198/370.04 |
| 4,569,434 | 2/1986 | Horii et al. | 198/370.04 |
| 5,570,773 | 11/1996 | Bonnet | 198/370.04 |
| 5,839,566 | 11/1998 | Bonnet | 198/370.04 |

FOREIGN PATENT DOCUMENTS

| | | |
|---|---|---|
| 33 06 175 A1 | 8/1984 | Germany . |
| 34 39 586 A1 | 4/1986 | Germany . |
| WO 86 06 305 A1 | 11/1986 | WIPO . |

*Primary Examiner*—Jospeh E. Valenza
*Attorney, Agent, or Firm*—Hoffman & Baron, LLP

[57] ABSTRACT

A trip device serves to cause at least one function on one or more means moved along a predetermined path of motion. It comprises an mounting rail on which a plurality of trip units and at least one bus station are mounted. The bus station is connected by a serial bus with a control means and is connected by flexible control cables with several trip unit. The bus station for its part produces suitable actuating signals from serial bus signals intended for the trip units, such actuating signals being fed to the respective trip units by means of the flexible control cables. On the other hand the bus station produces serial bus signals on the basis of sensor signals arriving from the trip units. Generally the trip device possesses a straightforward structure, renders possible high speeds of operation and is easily serviced.

15 Claims, 3 Drawing Sheets

TRIP DEVICE

BACKGROUND OF THE INVENTION

The invention relates to trip a device for tripping, i.e. causing, at least one function at one or more means moved along a predetermined path of motion on reaching at least one trip position.

THE PRIOR ART

Tripping devices of this type are more particularly employed in letter sorting equipment, where they are utilized to release items of mail, which have been sorted in accordance with destinations, at predetermined release positions. Such a sorting apparatus as a rule possesses a plurality of carriages, which are moved along a path of movement and have the mail items sorted in manner dependent on destination. Such a trip device possesses a plurality of trip units, which are arranged at predetermined trip positions, which are in agreement with the desired release positions. In order to release the contents of a carriage at a predetermined position the associated release unit is switched over at the correct time into a trip switching setting so that a trip member extends into the path of travel of an actuating element on the respective carriage and brings about the release operation as same passes by.

Trip devices as known heretofore are relatively complex in design and are difficult to service. If a trouble condition arises the associated mail sorting system consequently has to be shut down for consequently disproportionately long periods of time and this has a lasting effect on mail processing work. Therefore one object of the present invention is to provide a trip device more particularly for sorting equipment, which has a straightforward structure and may be run at a high speed and is extremely simple to service.

SHORT SUMMARY OF THE INVENTION

In order to achieve these and/or other objects appearing from the present specification, claims and drawings, in the present invention a trip device for causing at least one function on one or more means moved along a predetermined path of motion on reaching at least one trip position, comprises a mounting rail installed parallel to the path of motion, on which, distributed in the longitudinal direction at the trip positions, a plurality of trip units are mounted, said trip units being able to be switched over by electrical actuating signals between a non-actuated switching position and a trip switching position, said units being respectively fitted with a sensor means for detection of at least one of the possible switching positions, and at least one bus station also mounted on the mounting rail, such bus station being connected by means of a serial bus with a control device and by means of a flexible control cable with a plurality of such trip units, the bus station on the one hand producing actuating signals from serial bus signals intended for the connected trip units, such actuating signals being issued via the control cables to the respective trip units and on the other hand producing, from sensor signals arriving via the control cables from the trip units, serial bus signals intended for the control device.

It is in this manner that with a comparatively simple design it is possible to create a trip device which is extremely adaptable in use and possesses a straightforward structure. Owing to the control means it is possible to produce serial bus signals, which are read by the at least one bus station in accordance with the addressing thereof in conformity with the proper association and may be converted into simple actuating signals, which are supplied via the associated control cable to the respective trip unit. Sensor signals from the trip units may be returned along the same path in order to receive feedback concerning the current state of actuation. Because both the at least one bus station and also the trip units are arranged in common on a joint mounting rail, it is possible for the mounting rail to have the various means fitted to it before final installation at the position of use, the flexible control cables considerably facilitating the making of the individual connections. Dependent on the particular design of the trip device it is possible for one or preferably more bus stations to be mounted on the mounting rail. each bus station being responsible for driving a group of trip units so that there is an island-like linkage together. Because the individual components are distributed out along the mounting rail, there is an extremely straightforward and easily comprehended arrangement, which ensures satisfactory access for servicing and repair purposes.

Further advantageous developments of the invention are defined in the claims.

As already indicated, it is convenient for several bus stations to be arranged on a common serial bus, such stations being respectively coupled with a plurality of trip units. In this respect the bus stations may be incorporated in the row of trip units, it being preferable for each bus station to be flanked on either of the sides facing in the longitudinal direction of the rail by one or more trip units.

For the connection of a respective actuating trip unit the bus stations preferably have a corresponding number of input/output combination units, via which the actuating signals are issued and to which the sensor signals are supplied. It is more particularly advantageous for each bus station to have four such input/output combination units so that a simultaneous connection of four trip units is possible.

In order to render possible an orderly laying of the control cables and to avoid collisions with moving components arranged in the vicinity of the mounting rail, the mounting rail has at least one and preferably several cable grooves extending in the longitudinal direction of the rail, in which cable grooves the individual control cables are laid on their way between the bus station and the respective trip unit so that for a large part of their length they are in a cable groove. The cable grooves preferably extend in the carrying surface, which bears the bus stations and the trip unit, of the mounting rail, the individual control cables being able to be arranged under and past one or more trip units.

An arrangement which is more particularly convenient is one in which electrical contact between the bus stations and the serial bus is made using so-called penetration technology, which may be utilized extremely simply and ensures satisfactory electrical contacts. Thus the serial bus preferably possesses a flexible bus cable laid in a first cable groove of the mounting rail and more particularly having two conductors and which is brought into electrical contact with a respective bus station because the respective bus station has penetration contacts, which on placing the bus station on the mounting rail bite through the insulating casing on the bus cable and into the conductors.

It is preferred for the power supply to the bus stations to be separate from the transmission of the bus signals using its own power supply cable, which is it preferably also electrically contacted using penetration technology.

The power supply for the trip units is preferably via the associated control cables from the bus station so that a separate power supply is not required.

It is preferred for the actuating signals only to serve for the pilot controlled actuation of the trip units. The main actuation is then best by fluid power and more particularly pneumatic power, the operating fluid being able to be supplied to all trip units by way of a central common supply duct, which extends through the mounting rail in the longitudinal direction.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
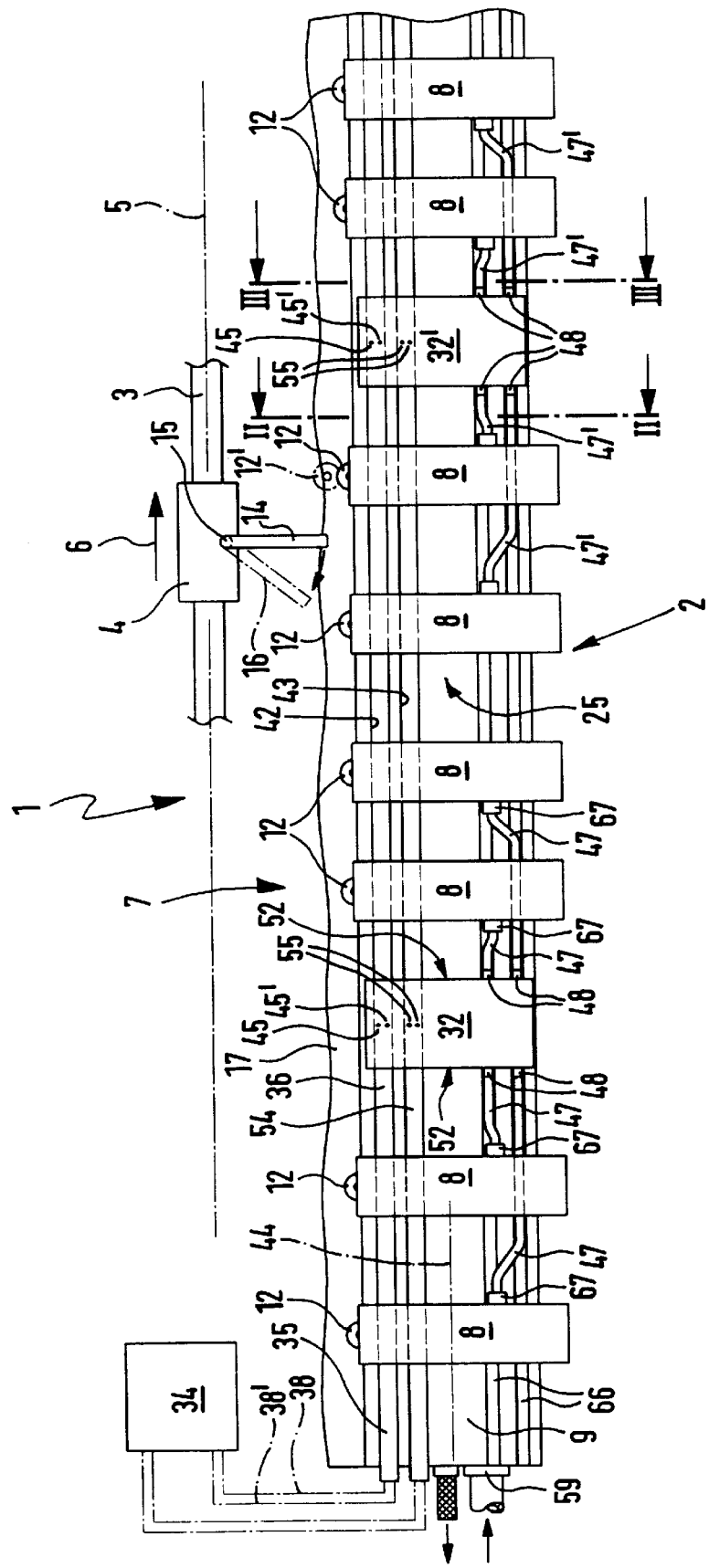
FIG. 1 shows a preferred design of the trip device in a diagrammatic representation looking toward the mounting face of the mounting rail, the direction of viewing being in accordance with that indicated in FIG. 2 by arrow IV.

FIG. 1 indicates a sorting apparatus 1, which is employed for the sorting of mail items such as letters or the like. The trip device 2 indicated diagrammatically in FIG. 1 constitutes in this case a component of the sorting apparatus 1. It is to be noted here that the sorting apparatus 1 may serve for various different sorting purposes and is not limited to the mail sorting field.

A component of the sorting apparatus 1 is a diagrammatically indicated guide means 3, on which a plurality of means constituted by carriages 4 are arranged to run along a path 5 of motion indicated in chained lines. A drive means, not illustrated in detail, renders possible movement of the carriages 4 so that they are moved along the path 5 of motion in the direction of motion 6 as indicated by the arrow.

Each of the carriages 4, of which only one is depicted, comprises at least one receiving space for objects, which are not illustrated, in the present case items of mail. These objects are to be released or discharged in a release station 7, through which the path 5 of motion extends, belonging to the sorting apparatus 1 at a predetermined release position from the carriage 4. In the release station 7 there are a number of release positions, distributed along the path 5 of motion, such positions as a rule corresponding to predetermined destinations for the items of mail and for example correspond to zip codes. Dependent on which destination the mail items are intended for, such items are discharged from the carriage 4 at the associated release position.

The release function is tripped or caused to take place by the trip device 2. For this purpose the trip device 2 possesses a number of trip units 8 equal to the number of the release positions, such units being arranged functionally adjacent to the desired release positions.

The trip units 8 are mounted on an mounting rail 9, which is installed to the side of the path 5 of motion and forms part of the trip device 2. The mounting rail 9 is a linear component and extends in parallelism to the path 5 of motion. Accordingly the trip units 8 are arranged in a row in sequence with a distance apart, such row being parallel to the path 5 of motion.

Each trip unit comprises a trip member 12, which in the working example is constituted by a roller lever pivotally mounted for movement about a pivot axis 13. In the non-actuated position of a trip unit 8 the trip member thereof is cleared of the path of travel of an actuating member 14, provided on the respective carriage 4, such actuating member in the working example being in the form of an actuating lever pivoting about a pivot axis 15. The actuating member 14 may therefore move past the non-actuated trip units 8 without anything happening. Using electrical actuation signals the trip units 8 can be moved independently of each other out of the non-actuated position into an actuated switching position, which will here be referred to as the trip switching position. If a trip unit 8 is in the trip switching position, the associated trip member 12 will move as indicated at 12' in chained lines into the path of movement of the actuating member 14, which accordingly on reaching the associated trip position will be moved into a release position 16 as indicated in chained lines. The latter takes place in the working embodiment of the invention by pivoting about the pivot axis 15 and means that the carriage will be emptied.

The mounting rail 9 is preferably manufactured of aluminum material and is in the form of an extruded component. It is arranged on a holding structure 17 of the apparatus and aligned in the manner mentioned above. Attachment of the rail may be with the use of an attachment plate 18, which on the one hand is fixed in some suitable fashion to the holding structure 17—for example by screwing or welding in place—and on the other hand in a releasable fashion bears the mounting rail 9. For this purpose an anchoring groove 19 may be provided in 15 the mounting rail running in the longitudinal direction, such rail permitting simple attachment on the attachment present 18 with shoes 23 and screws 24.

On one side the mounting rail 9 has a mounting face 25, which extends over the entire length of the mounting rail 9 and on which the trip units 8 may be detachably fixed. Assembly is preferably performed using at least one anchoring groove 26, which is machined in the mounting face 25 and which like the attachment groove 19 is undercut. Shoes 27 may be arranged in the anchoring groove 26 into which assembly screws 28 may be screwed extending through the respective trip unit 8. This means that it is unnecessary to produce special holes in the mounting rail 9. The assembly screws 28 can be employed to clamp the assembly units 8 firmly against the mounting face 25.

To illustrate the arrangement more clearly the anchoring groove 26 is omitted in FIG. 1.

Furthermore a plurality of block-like bus stations 32 are mounted on the mounting face 25. Their attachment is preferably in a manner similar to that of the trip units 8 using the anchoring groove 26. The necessary fastening screws and shoes are not illustrated in drawing.

The attachment groove 19 and the anchoring groove 26 are preferably so designed that the first time the attachment plate 18, a trip unit 8 or a bus station 32 the respective shoe 23 and 27 is fixed in the respective groove. On later unscrewing of a screw 24 and 28, for example for servicing purposes, the shoes consequently remain in their original positions without any additional mechanical effect. This permanent retention prevents any undesired shifting within the respective groove and hence facilitates the following later re-attachment of the unscrewed parts or any replacement parts at the original position.

Figure 2:
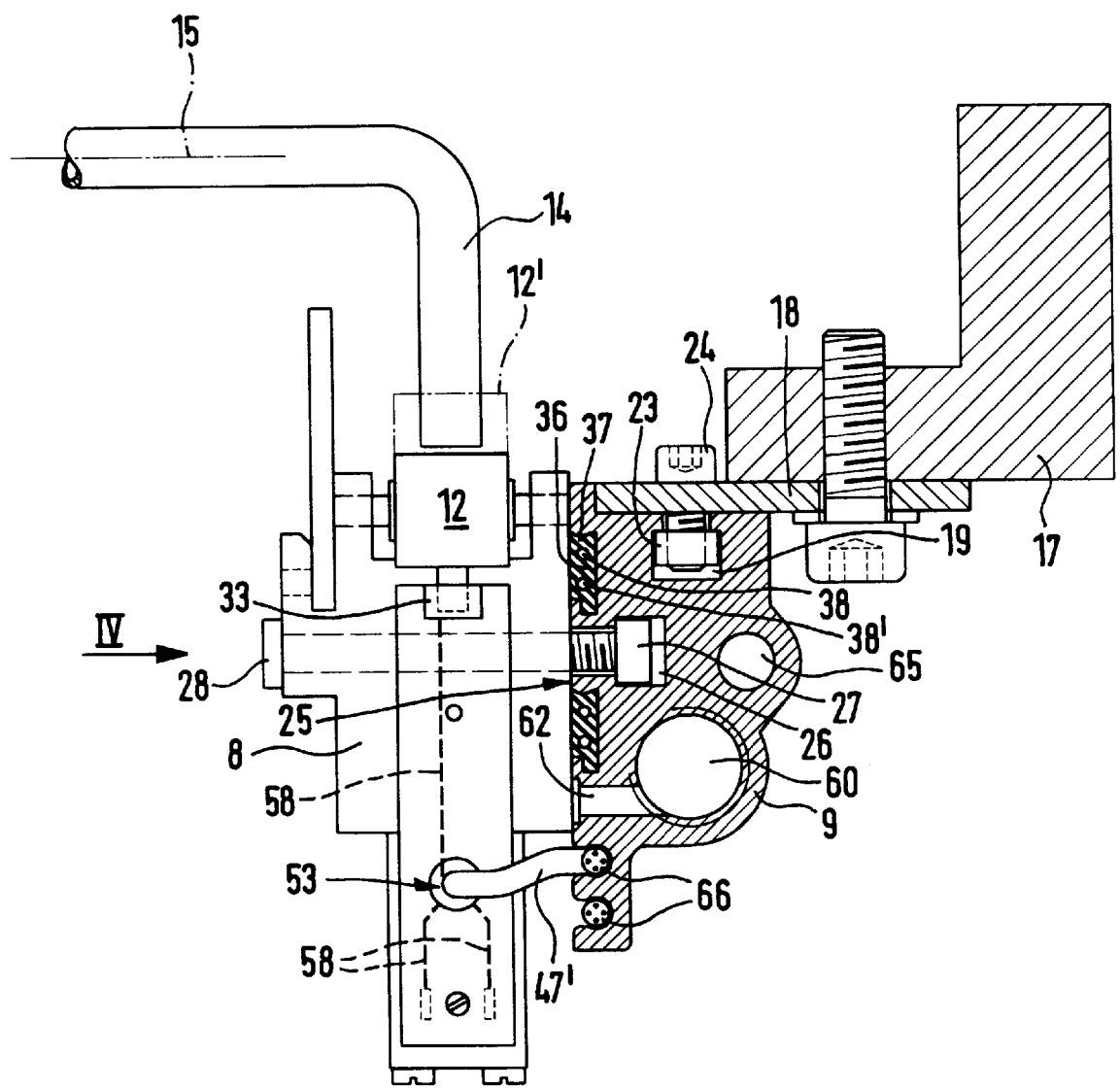
FIG. 2 is a cross section taken through the trip device of FIG. 1 on the section line II—II.
Figure 4:
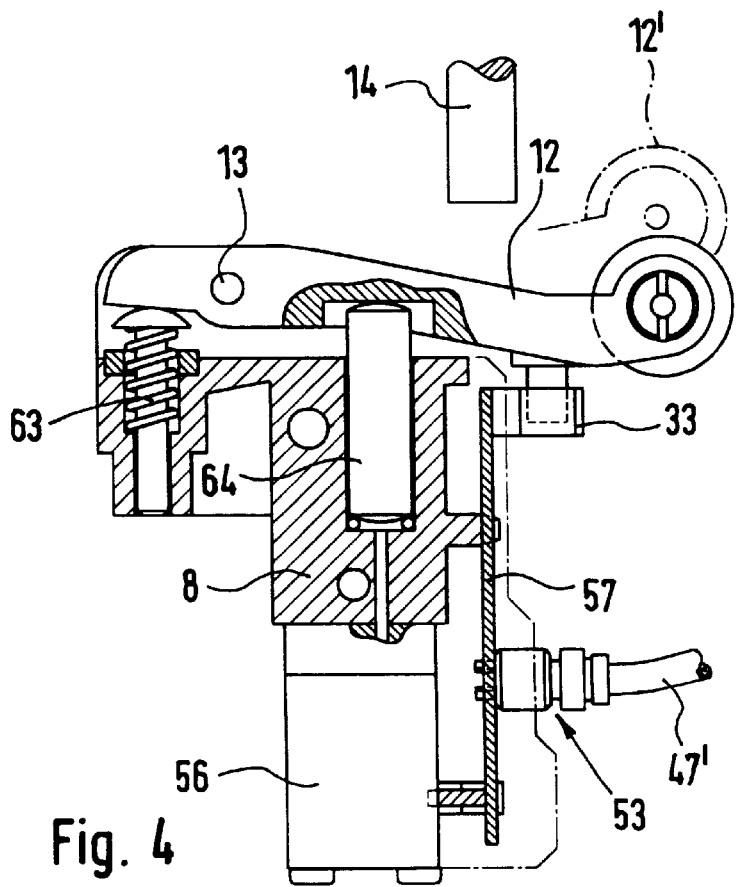
FIG. 4 is a plan view of the trip unit indicated in FIG. 2, partially in section and looking as indicated by the arrow VI toward the mounting plane of the mounting rail, which for its part is not illustrated.

Each trip unit 8 is provided with a sensor device 33 as indicated in FIGS. 2 and 4, which renders possible the detection of at least one of the possible switching positions of the trip member 12. In the illustrated working embodiment the trip switching position is shown as being detected. The sensor means 33 may for example be a Hall sensor.

For operation of the trip units 8 in the working example a control means 34 is provided beyond the mounting rail 9, which means 34 communicates via a serial bus 35 with the bus stations 32 attached in a releasable manner to the mounting rail 9. Preferably the serial bus 35 is in the form of a so-called ASI bus and has a flexible bus cable 36 with two conductors 38 and 38' running alongside each other in a rubber-elastic casing 37.

The production of an electrical contact between the bus stations 32 and the common serial bus 35 is preferably using so-called penetration technology. For this purpose in the mounting rail 9 the bus cable 36 extends in a first cable groove 42, which is cut into the mounting face 25 and extends as indicated in chained lines in the longitudinal direction 44 of the mounting rail 9. The first cable groove 42 is open at the end, that is to say at the one narrow side of the mounting rail 9, which is not illustrated along its full length so that the bus cable 36 may be readily introduced from the end.

Each bus stations 32 has a number of electrical contact elements 45 and 45' equal at least to the number of conductors 38 and 38', such elements 45 and 45' being designed as penetration elements and preferably as pin-like structures projecting past the lower side, resting against the mounting face 25, of the housing 46 of the bus station 32. On placing the bus station 32 on the mounting face 25 the electrical contact elements 45 and 45' penetrate the casing 37 and come into contact with the conductors 38 and 38' so that the desired electrical connection is produced.

The electrical contact between the bus cable 36 and the external control means 34 may also be produced by penetration technology or in a conventional fashion.

In principle the assembly plate 9 could be fitted with a single bus station, which serves for the control of all trip units 8 present. For the sake of better order, more particularly as regards the cables laid in the working embodiment, however a plurality of bus stations 32 and 32' are provided, which are jointly connected with the serial bus 35. Each of these bus stations 32 and 32' serves for driving several trip units 8, it being connected with the associated trip units 8 by way of a flexible control cable 47 and 47'. There is consequently a grouped arrangement of trip units 8 associated with different bus stations 32 and 32'.

In order to simplify the wiring as much as possible the bus stations 32 and 32' are arranged in the row of trip units 8 on the mounting rail 9. Each bus station 32 and 32' is flanked on either of its sides turned in the longitudinal direction 44 of the rail, by respectively one or more trip units 8. In the illustrated working embodiment each bus station 32 and 32' is mounted between two trip units 8 connected with it with the aid of control cables 47 and 47', each bus station 32 and 32' being designed from the control aspect for communication four trip units 8. Each bus station 32 and 32' is fitted with a decoding and encoding unit, not illustrated in detail, which is in a position of converting serial bus signals into parallel control signals.

During operation of the trip device the bus stations 32 and 32' read those of the serial bus signals supplied by the control means 34 via the serial bus 35, which are intended for one of the trip units 8 connected with the respective bus station 32 and 32'. This is done in a known manner using suitable addressing. In the decoding and encoding unit actuating signals are produced from the serial bus signals, which are then issued or transferred by the bus station 32 and 32' via the associated control cable 47 and 47' to the respective trip unit 8. The transmission of the actuating signal takes place 1:1, that is to say the decoding and encoding unit performs a decoding operation in such a manner that only the addressed trip unit 8 is supplied with an actuating signal, whereas the remaining connected trip units 8 do not receive any signal in this case.

If a trip unit 3 has been switched over by an actuating signal into the trip switching position, the sensor means 33 will produce a sensor signal, which for its part then passes in 1:1 format via the connected control cable 47 and 47' to the associated bus station 32 and 32'. This input sensor signal is then encoded in the decoding and encoding unit in order to obtain a serial bus signal which is transferred with the aid of the serial bus to the control means 34, which is then able to verify a completed switching over operation.

Inside the control cables 47 and 47' of the present working example of the invention there is a transfer of the actuating signals and of the sensor signals using different conductors, which are collected together in the control cable 47 and 47'. For each control cable 47 and 47' the bus stations 32 and 32' are provided with an input/output connection combination unit 48—referred to in the following as "signal connection 48" for the sake of simplicity—which is best designed in the form of a plug connection and renders possible a releasable plug connection with the associated control cable 47 and 47'.

It is best for the lateral faces 52 turned in the longitudinal direction 44 of the rail of each bus station 32 and 32' to possess a plurality of signal connections 48, adjacent to which there is a corresponding number of driven trip units 8. Thus in the working of the present invention on the two lateral faces 52 of the bus stations 32 and 32' there are respectively two signal connections 48, which via control cables 47 and 47' are connected with two trip units 8 arranged on the same side.

It is possible to have a connection between the control cables 47 and 47' and the trip units 8 using plug connection means 53, as are indicated for example in FIGS. 2 and 4.

Figure 3:
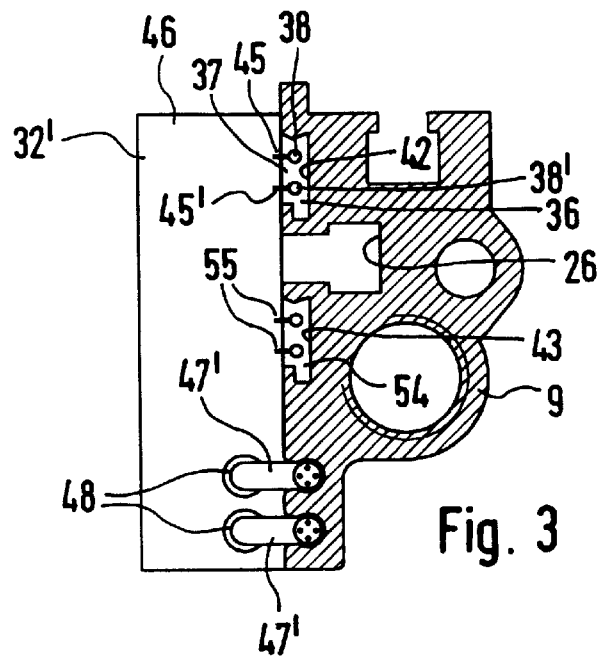
FIG. 3 shows a further cross section taken through the trip device of FIG. 1 on the section line III—III.

The bus stations 32 and 32' are preferably provided with a power supply independent of the transmission of the bus signals. In the illustrated working embodiment this is made possible because a second cable groove 42 is provided in the mounting face 52 adjacent to the first cable groove 42, such second cable groove extending in parallelism to the first cable groove 42 along the length of the mounting rail 9 and is laid in a flexible power supply cable 54. The structure of the power supply cable 54 is the same as that of the bus cable 36 in the embodiment and accordingly electrical contact may be produced by penetration technology as explained above. The corresponding electrical contact elements 55 are indicated in FIGS. 1 and 3. On fastening the bus stations 32 and 32' to the mounting rail 9 there is hence both the production of an electrical contact with the serial bus and also a connection with the power supply.

The cross section of the bus cable 36 and of the power supply cable 54 is preferably so matched to the cross section of the respectively adjacent cable groove 42 and 43 that the cables project past and are proud of the mounting face 25. The consequence of this is that on placing a bus station 32 on the mounting rail 9 the station has its lower side, which faces the mounting face 25, thrust against the cables 36 and 54. Accordingly a sealing contact is produced between the elastic cable casing 37 and the housing of the bus station 32 in the peripheral region of the illustrated in contact elements 45, 45'; 55 and 55'. The electrical contact elements are thus protected against the effects of the surroundings such as moisture or dust, a protective effect complying with IP 54 at least being preferably achieved. The above mentioned types of contamination from the surroundings are more particularly prevented from gaining access between the closely adjacent electrical contact elements 45 and 45' and, respectively, 55 and 55' so that short circuits or other interference with proper functioning are prevented.

The trip units 8 are each provided with an electrically operated actuating unit 56, which in the illustrated working embodiment is constituted by a solenoid valve. The power supply for the actuating units 56 is preferably also via the control cables 47 and 47' from the associated bus station 32 and 32'. The control cables 47 and 47' are hence made with a corresponding number of cores. From FIGS. 2 and 4 it will be seen that the electrical connection between the plug connection means 53 on the one hand and the sensor means 33 and furthermore the actuating unit 56 on the other hand may be via a printed circuit board 57 on the trip unit 8. This printed circuit board 57 carries on the one hand the one half of the plug connection means 53 and on the other hand the electrical conductors 58, which lead to the connection contacts of the sensor means 33 and the actuating unit 56.

It is preferred for the actuating unit 56 of each respective trip unit 8 to form an electrically actuated pilot control unit, which acting like a switching relay causes the main fluid power actuation of the trip unit 8. As an operating fluid for the main actuation of the trip units 8 compressed air is utilized in the working example, such compressed air being supplied at a terminal connection point 59 into a supply duct 60, which extends in the longitudinal direction through the mounting rail 9. From the supply duct 60 there branch off ducts 62 at points functionally adjacent to the individual trip units 8, such ducts opening at the mounting face 25 and communicating in a manner not illustrated with the interior of the trip unit 8 mounted here. If the actuating unit 56 receives an actuating signal, the operating fluid then fed in can act on the trip member 12 and shift it into the trip switching position, this being against the force of a return spring 63 in the working example. The action on the trip member 12 occurs in the working example by virtue of an intermediately placed actuating plunger 64.

For returning the trip unit 8 into the non-actuated switching position it is merely necessary to deactivate the actuating unit 56 by discontinuing the actuating signal. The spent air then released at the respective trip unit 8 may then be discharged directly into the surroundings or preferably, as in the embodiment of the invention, through a central waste air duct 65, which extends in the interior of the mounting rail 9 in parallelism to the supplied duct 60 and in a similar manner to it escapes through the branch ducts to communicate with the trip units 8. For instance using a silencer mounted terminally on the mounting rail 9 it is possible for the spent air to be discharged into the surrounding atmosphere from the mounting rail. It is however possible to arrange for discharge at a further removed point using a spent air hose which is suitably connected.

In order to render possible laying of the control cable 47 and 47' without damage, the mounting rail 9 possesses at least one groove 66, which extends along the entire length of the mounting rail 9 in the longitudinal direction 44 thereof. In the working embodiment two such cable grooves 66 are provided, which extend in parallelism to one another and are cut into the mounting face 25. They are consequently, like the two cable grooves 42 and 43, open toward the mounting face 25 and are partially covered over by the bus stations 32 and 32' mounted thereon and the trip units 8. The cable grooves 66 render it possible to accommodate the control cables 47 and 47' in the mounting rail 9 so that they are protected for a major part of their length, the cables only extending from the associated cable groove 66 at their two ends where connections are made.

The number of the cable grooves 55 will be preferably equal to the number of signal connections 48 provided for each side face 52 of the bus stations 32 and 32'. For this purpose the arrangement is preferably so made that respectively one of the cable grooves 66 is opposite to the one of the signal connections 48 in a direction perpendicular to the mounting face 25. The connection points defined by the plug connection means 53 on the trip units 8 are preferably so placed in the working embodiment that they lie above the groove arrangement. This makes a comparatively straight laying of the control cables 47 and 47' possible.

Because it is a question of cable grooves 66 extending right through in the longitudinal direction 44 of the rail there is furthermore the possibility as indicated in FIG. 1 of threading through a control cable 47 and 47', running to the next but one trip unit 8, underneath the trip unit 8 which is directly next to the bus station 32 and 32' without any interference.

It is convenient for the cable grooves 66 to be located in the vicinity of one of the longitudinal edges of the mounting rail 9. Their cross section can be so shaped that the control cables 47 and 47' may be clipped in place.

The trip device 2 may be extended in the longitudinal direction without limitation and may be fitted with any desired number of bus stations and trip units 8. In order to produce systems with a very great length it is possible for a multiple part mounting rail 9 to be employed, whose individual rail elements are preferably joined together so that a continuous rail structure results.

What is claimed is:

1. A trip device for causing at least one function on one or more means moved along a predetermined path of motion on reaching at least one trip position, comprising an mounting rail installed parallel to the path of motion, on which, distributed in the longitudinal direction at the trip positions, a plurality of trip units are mounted, said trip units being able to be switched over by electrical actuating signals between a non-actuated switching position and a trip switching position, said units being respectively fitted with a sensor means for detection of at least one of the possible switching positions, and at least one bus station also mounted on the mounting rail, such bus station being connected by means of a serial bus with a control device and by means of a flexible control cable with a plurality of such trip units, the bus station on the one hand producing actuating signals from serial bus signals intended for the connected trip units, such actuating signals being issued via the control cables to the respective trip units and on the other hand producing, from sensor signals arriving via the control cables from the trip units, serial bus signals intended for the control device.

2. The trip device as set forth in claim 1, wherein a plurality of bus stations, connected with a common serial bus, are mounted on the mounting rail, such bus stations being each connected with a plurality of such trip units.

3. The trip device as set forth in claim 1, wherein at least one bus station is incorporated in the row of trip units on the mounting rail.

4. The trip device as set forth in claim 1, wherein at least one bus station on the mounting rail is flanked on both sides thereof facing in the longitudinal direction of the rail by respectively at least one trip unit.

5. The trip device as set forth in claim 1, wherein each bus station is provided with a plurality of input/output combination units, serving for the connection of a respective trip unit, a control cable being associated with each of the combination units.

6. The trip device as set forth in claim 5, wherein on sides thereof facing in the longitudinal direction of the rail the bus station is provided respectively with at least one input/output combination unit.

7. The trip device as set forth in claim 1, wherein the mounting rail possesses at least one and preferably more cable grooves extending in the longitudinal direction of the rail, in which the individual control cables are laid.

8. The trip device as set forth in claim 7, wherein the cable grooves extend in the mounting face, which carries at least one bus station and the trip units, and preferably extend in the vicinity of one of the longitudinal rail edges.

9. The trip device as set forth in claim 1, wherein the serial bus is provided with a flexible bus cable in a first cable groove extending in the longitudinal direction of the rail, in the mounting rail, conductors of such cable being penetration-contacted by at least one bus station.

10. The trip device as set forth in claim 1, comprising a flexible power supply cable running in a second cable groove extending in the longitudinal direction of the rail, the conductors of such power supply cable being electrically penetration-contacted with the at least one bus station.

11. The trip device as set forth in claim 1, wherein the power supply for the trip units is adapted to be provided through the respectively associated control cable.

12. The trip device as set forth in claim 1, wherein said serial bus is an ASI bus.

13. The trip device as set forth in claim 1, comprising means for pilot operation of the trip units using the actuating signals, the main operation being by fluid power and more particularly pneumatically and the actuating fluid being supplied through a feed duct extending in the longitudinal direction in the mounting rail, such feed duct having branch ducts joined therewith at the trip positions and in communication with the trip units.

14. The trip device as set forth in claim 1 wherein the mounting rail possesses at least one anchoring groove extending in the longitudinal direction of the rail, by means of which anchoring groove the bus stations present and the trip units are mounted in place.

15. The trip device as set forth in claim 1, said trip device being part of a sorting apparatus and more particularly part of a sorting apparatus for mail items such as letters.

* * * * *